United States Patent [19]

Billon-Pierron et al.

[11] Patent Number: 4,528,435
[45] Date of Patent: Jul. 9, 1985

[54] WIRE CUTTING PROCESS AND APPARATUS

[75] Inventors: Claude Billon-Pierron, St. Etienne de Crossey; Jean Chavand, Grenoble; Michel Peccoud, Claix, all of France

[73] Assignee: Commissariat A L'Energie Atomique, Paris, France

[21] Appl. No.: 571,804

[22] Filed: Jan. 18, 1984

[30] Foreign Application Priority Data

Jan. 25, 1983 [FR] France ............................. 83 01094

[51] Int. Cl.³ .................... B23K 9/225; B23K 31/10
[52] U.S. Cl. .................................. 219/69 M; 219/68; 83/926 B
[58] Field of Search ............... 219/137 R, 68, 69 R, 219/69 M, 121 R; 83/926 B; 140/139

[56] References Cited

U.S. PATENT DOCUMENTS 3,553,417  1/1971  Smith et al. ............... 219/68 X

FOREIGN PATENT DOCUMENTS 1263919   5/1961  France .
2504432  10/1982  France .
1558595   1/1980  United Kingdom .

Primary Examiner—Roy N. Envall, Jr.
Assistant Examiner—C. M. Sigda
Attorney, Agent, or Firm—James E. Nilles

[57] ABSTRACT

A wire is wound around an elongated support and a series of successive electric arcs is struck between at least one electrode in a transverse plane of the support and the wire, in such a way that the latter is struck by at least one of the arcs. A hollow member having a bevel shaped end raises the downstream part of the wire and a tubular member prevents the upstream part of the wire to be moved too far away from the support.

4 Claims, 5 Drawing Figures

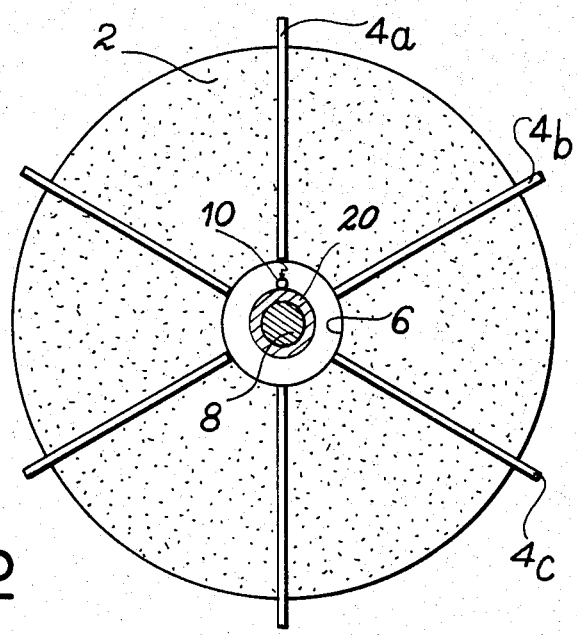
FIG. 2
FIG. 3
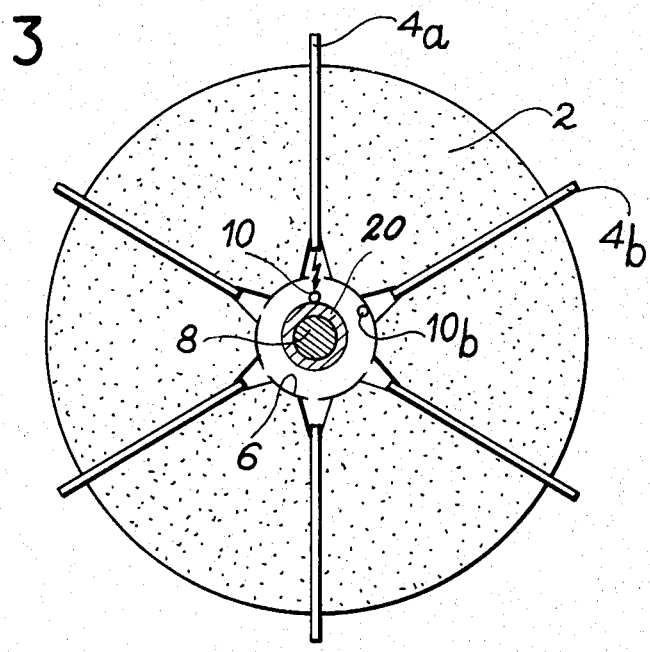

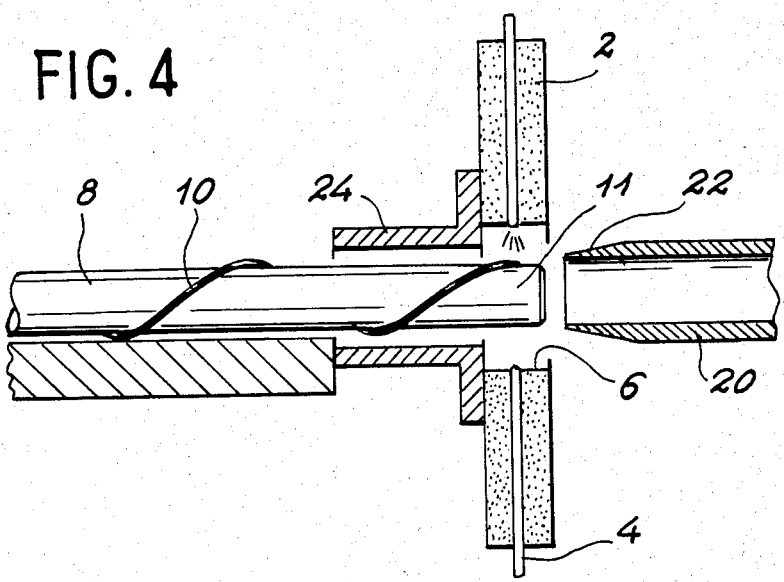
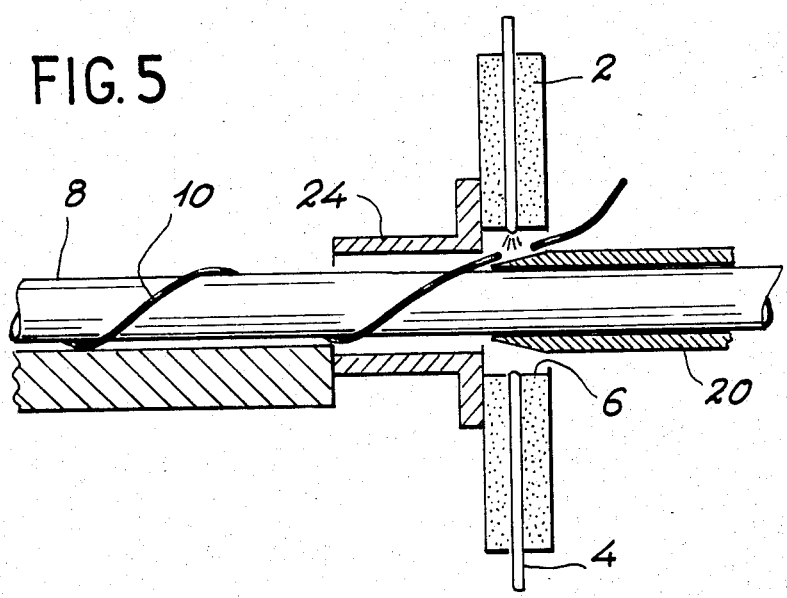

WIRE CUTTING PROCESS AND APPARATUS

BACKGROUND OF THE INVENTION

The present invention relates to a process and an apparatus for cutting the spacing wire of nuclear fuel rods or needles and more generally applicable to the cutting off of any thin, long metal part placed on a larger support.

The presently used processes for disengaging the spacing wire from nuclear fuel rods when the latter have stopped operating are generally mechanical processes consisting firstly of disengaging the point by which the wire is fixed to the rod using a rotary tool or by melting the wire and the weld spot using an electric arc or a high frequency source before cutting up the wire into small pieces, mechanical methods always being used. These non-repetetive processes make it necessary to recognize the positioning of the wire, i.e. its orientation relative to the rod and after disengaging the wire it is not always easy to cut it up into small pieces. It is also necessary to work in contact with the element which is to be destroyed.

BRIEF SUMMARY OF THE INVENTION

The present invention aims at eliminating these disadvantages by proposing a process and an apparatus ensuring the cutting up of the spacing wire without necessitating any detection of the positioning of the wire and permitting the destruction and cutting up thereof at high speed. According to the main feature of the process according to the invention and with the wire wound around an elongated support over at least part of the length thereof, a series of successive electric arcs are struck between at least one electrode placed in a transverse plane of the support and the wire, in such a way that the latter is struck by at least one of these arcs.

According to another feature of this process, after striking a series of arcs in a transverse plane of the support, the latter is advanced by a predetermined length in order to recommence the operation in another transverse plane.

Optionally, it is possible to provide a supplementary stage consisting of striking an arc able to destroy a weld point between the wire and the support. Moreover, in order to protect the ends of the electrodes against oxidation, the area in which the arcs are struck should be scavenged with a neutral gas, such as e.g. argon.

The invention also relates to an apparatus for performing this process, which comprises a support having an opening permitting the passage of the member around which is wound the wire, at least one electrode mounted on the support and a device making it possible to strike an electric arc between the electrodes and the wire wound around the member, a movable hollow part with an opening permitting the passage of the member supporting the wire, the end of the hollow part closest to the support having a shape such that it brings about the disengagement of the wire from the member around which it is wound during the advance thereof and a tubular part placed upstream of the support with respect to the direction of movement of the member on which is wound the wire, said hollow part having an opening permitting the passage of the member supporting the wire, but whose dimensions are at the most equal to those of the opening made in the support.

BRIEF DESCRIPTION OF THE DRAWINGS

The invention is described in greater detail hereinafter relative to non-limitative embodiments and with reference to the attached drawings, wherein show:

FIG. 2 a diagrammatic sectional view showing the arrangement of the electrodes in the apparatus of FIG. 1.

FIG. 3 a view similar to FIG. 2 illustrating another arrangement of the electrodes.

FIG. 4 a diagrammatic view of the apparatus equipped with a device making it possible to separate the wire from the rod downstream of the device during the starting up of the apparatus.

FIG. 5 a view similar to FIG. 4 showing the apparatus in operation, the movable hollow part having been placed in front of the electrodes.

DETAILED DESCRIPTION OF THE PREFERRED EMBODIMENTS

Figure 1:
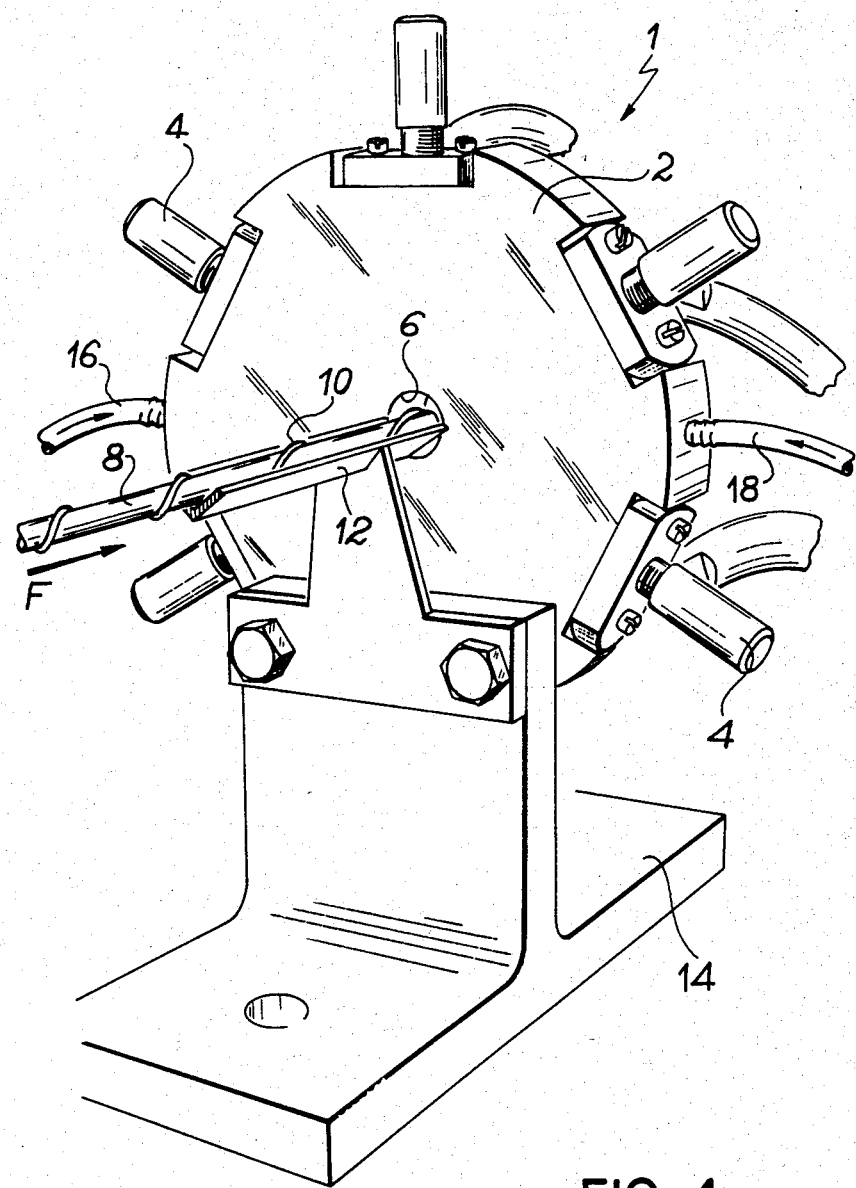
FIG. 1 a diagrammatic perspective view of the apparatus according to the invention.

FIG. 1 shows that the apparatus according to the invention 1 essentially comprises a circular support 2, to which are fixed six electrodes 4, which are regularly distributed around the circumference of support 2. The latter is centrally provided with an opening 6 permitting the passage of rod 8, around which is wound the spacing wire 10, the rod moving in the direction of arrow F. Rod 8 is supported and guided by a channel 12, the latter being fixed to a base 14, which also supports support 2. It is also possible to see two pipes 16, 18, which are able to supply a neutral gas, e.g. argon, into the opening 6 at the location where the electric arcs are struck.

The apparatus functions in the following way. Rod 8 is immobilized in a predetermined position and an electric arc is struck between each of the electrodes 4 in succession and the wire 10 of rod 8. The number and arrangement of the electrodes are such that the impact points of the arcs on wire 10 partly overlap, in such a way that the external surface of a given cross-section of rod 8, i.e. that located substantially in the plane defined by support 2 and electrodes 4, is struck by at least one of the arcs, thereby ensuring that at least one of them strikes wire 10 and cuts it. Once the arcs have been struck over a complete turn, the rod 8 is advanced in the direction of arrow F by a length corresponding to the desired length for the spacing wire portions and a new series of arcs is struck over another section of rod 8, a conical end fitting tube being interposed in the manner to be described hereinafter.

FIG. 2 is a diagrammatic sectional view in the plane defined by electrodes 4. It shows that an arc is firstly struck between one of the electrodes, e.g. electrode 4a, and the wire 10 supported by hollow part 20.

If wire 10 was not in the position shown in this drawing, it would be struck by one of the arcs induced between the other electrodes, e.g. 4b, 4c, etc., because not only is there an overlap of the impact points, but it is also possible to provide an overlap time between two consecutive arcs. The electrodes are connected to a not shown high frequency generator, whilst part 8 is in electrical contact with channel 12, which serves as an earth connection in order that the arc can be struck between each electrode 4 and wire 10. Such an apparatus not only makes it possible to cut the wire into pieces of a given length, but also makes it possible to disengage it from rod 8 by destroying and smoothing the weld spots with the aid of arcs, as shown in FIG. 4.

For trial purposes, an experimental installation was constructed comprising two welding stations, an automatic equipment cubicle and two high frequency arc generators, each supplying three of the six electrodes of the installation. A rotary switch successively distributes the power to the different electrodes or torches with an overlap time, in such a way that the arc is transferred from one electrode to the next and thus covers the entire circumference of the rod. The power required was very low, not exceeding 50 A low voltage, which leads to few torch cooling problems. The intensity used was approximately 45 A for melting the weld spot of the wire on the rod, the same intensity being necessary for smoothing the weld spots to ensure that they did not form roughnesses which might provoke catching in reprocessing equipment. In the case of a wire of diameter 12/10° mm, an intensity of 20 A proves sufficient for cutting the wire into pieces of a predetermined length.

FIG. 2 illustrates a variant in which the ends of the electrodes are located exactly on the wall of opening 6, whilst in the case of FIG. 3 the ends of the electrodes are on a circle having a larger diameter than opening 6, e.g. a diameter of 20 mm, whilst the diameter of opening 6 is 15 mm.

FIG. 4 shows the starting up of the apparatus. Wire 10, fixed at one of its ends 11, constituting the plug of rod 8, is cut and disengaged from the rod. Hollow part 20 is removed from support 2. As soon as wire 10 has been disengaged from the rod plug, hollow part 20 is placed in the operating position, i.e. it is introduced into the opening 6 of support 2, as shown in FIG. 5.

For this purpose, end 22 of part 20 has a bevelled shape with a very elongated chamfer, in order that the downstream part of wire 10 is raised and removed from rod 8 during the advance thereof. Thus, hollow part 20 is interposed between the arc and the rod, which prevents any action of the arc on said rod.

To ensure that the upstream part of wire 10 is not moved too far away from the rod, a tubular part 24 is positioned between support 2 and channel 12, its diameter being at the most equal to that of opening 6.

Thus, the process and apparatus according to the invention offer numerous advantages, because they make it possible to cut fuel rod spacing wires at a very high speed and with a certainty of cutting the wire in a given section, no matter what the position and orientation of the rod relative to support 2. Moreover, there is no contact with the parts and no problem is caused through a possible deformation of the rod. It is also possible to eliminate the extra thicknesses caused by the weld spot because, with an electric arc, it is possible to spread the same over a sufficiently large surface to ensure that there is no roughness.

The invention is obviously not limited to the single embodiment described and numerous variants are possible thereto without passing beyond the scope of the invention. Thus, although an apparatus with six electrodes has been described, the number and shape thereof can be varied and will be chosen as a function of the dimensions of the parts to be processed. The same applies with regards to the choice of the intensities to be used for cutting the wire or for destroying the weld spot. Finally, although the invention has been described in connection with the special case of cutting the spacing wire of nuclear fuel rods, it can also be used in other fields and particularly wherever it is a question of cutting a thin, long part, e.g. a small diameter tube, wound onto a larger support. The latter can be a tube or a cylindrical support, or possibly an elongated part having a random cross-section, provided that it is possible to strike electric arcs over the entire periphery of the latter, in order to cut up the part which is wound onto the support.

What is claimed is:

1. A process for cutting a wire or a thin elongated metal part wound around a member having an elongated shape over at least part of the length thereof, said process comprising the following steps:

striking a series of successive electric arcs between a series of electrodes located in a plane transverse of said member, said member being motionless with respect to the electrodes, the arrangement of the electrodes being such that the impact points of the arcs partly overlap so that the wire is struck by at least one of the arcs and is cut, advancing said member by a predetermined length, and striking another series of arcs in another plane transverse of said member, thus cutting the wire into pieces of a predetermined length.

2. A process as in claim 1, said process comprising at least another step consisting of destroying a weld spot of the wire on said member by striking still another series of electric arcs between the electrodes and the wire in the plane transverse of said member which contains said weld spot.

3. A process as in claim 1 wherein the area in which the arcs are struck is swept by an inert gas.

4. An apparatus for cutting a wire wound around a member having an elongated shape over at least part of the length thereof, said apparatus comprising:

a support having an opening for said member to pass through, a series of electrodes mounted on said support, an electrical power supply means connected with said electrodes in order to strike electric arcs between said electrodes and said member, said electrodes being arranged so that the impact points of the arcs on said member partly overlap, and the impact points cover the whole external surface of said member in a transverse plane thereof, a movable hollow part having an opening allowing said member to pass through said hollow part having at least one end located near said support, whose shape brings about severing of the wire from said member during movement of the latter, and a tubular part located on the other side of said support with respect to said movable hollow part, said tubular part having an opening for said member to pass through, the dimensions of said opening being smaller than or equal to said opening of said support.

* * * * *